US006375782B1

(12) United States Patent
Kumar et al.

(10) Patent No.: US 6,375,782 B1
(45) Date of Patent: Apr. 23, 2002

(54) PROCESS FOR THE MANUFACTURE OF DECORATIVE STAINLESS STEEL ARTICLES

(75) Inventors: Joginder Kumar; Amit Kumar; Rahul Kumar, all of Delhi (IN)

(73) Assignee: J. Kumar (IN)

( * ) Notice: Subject to any disclaimer, the term of this patent is extended or adjusted under 35 U.S.C. 154(b) by 0 days.

(21) Appl. No.: 09/173,102

(22) Filed: Oct. 15, 1998

(30) Foreign Application Priority Data

Jul. 30, 1998 (IN) ........................................ 2229/Del/98

(51) Int. Cl.[7] ........................... B44C 1/17; B32B 31/20; B32B 31/22; B05D 5/04; B41M 3/12

(52) U.S. Cl. ....................... 156/230; 156/240; 156/241; 156/247; 156/277; 156/289; 427/147; 427/148; 427/318; 428/914

(58) Field of Search ................................. 156/230, 231, 156/234, 236, 239, 240, 241, 247, 277, 289; 427/146, 147, 148, 149, 319, 318; 428/914

(56) References Cited

U.S. PATENT DOCUMENTS

| | | | | | |
|---|---|---|---|---|---|
| 3,992,211 | A | * | 11/1976 | Skoll | 106/1 |
| 4,980,008 | A | * | 12/1990 | Woods et al. | 156/230 |
| 5,061,315 | A | * | 10/1991 | Collier et al. | 106/14.05 |
| 5,641,372 | A | * | 6/1997 | Okuno | 156/230 |
| 5,916,723 | A | * | 6/1999 | Hand | 430/126 |
| 6,136,126 | A | * | 10/2000 | Fenzi | 156/230 |

* cited by examiner

*Primary Examiner*—Richard Crispino
*Assistant Examiner*—J. A. Lorengo

(57) ABSTRACT

A process for making a decorative steel article includes the steps of providing a stainless steel preform, washing the preform, coating a surface of the preform, and transferring step involves securing a transfer foil with the decorative pattern to the coated surface, heating the transfer foil and preform, and removing the transfer foil while leaving the decorative pattern on the coated surface.

21 Claims, 1 Drawing Sheet

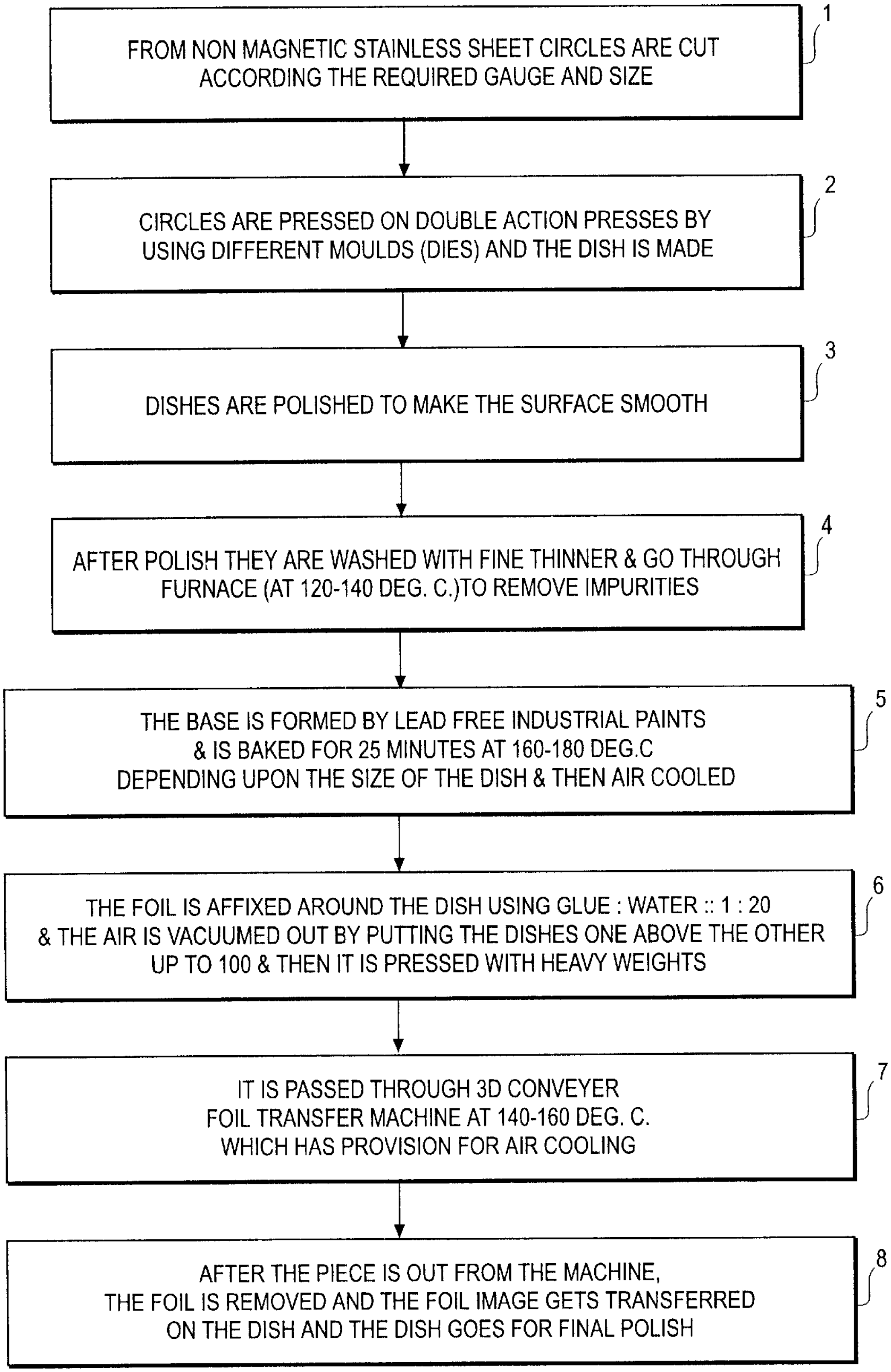
1
FROM NON MAGNETIC STAINLESS SHEET CIRCLES ARE CUT ACCORDING THE REQUIRED GAUGE AND SIZE
2
CIRCLES ARE PRESSED ON DOUBLE ACTION PRESSES BY USING DIFFERENT MOULDS (DIES) AND THE DISH IS MADE
3
DISHES ARE POLISHED TO MAKE THE SURFACE SMOOTH
4
AFTER POLISH THEY ARE WASHED WITH FINE THINNER & GO THROUGH FURNACE (AT 120-140 DEG. C.)TO REMOVE IMPURITIES
5
THE BASE IS FORMED BY LEAD FREE INDUSTRIAL PAINTS & IS BAKED FOR 25 MINUTES AT 160-180 DEG.C DEPENDING UPON THE SIZE OF THE DISH & THEN AIR COOLED
6
THE FOIL IS AFFIXED AROUND THE DISH USING GLUE : WATER :: 1 : 20 & THE AIR IS VACUUMED OUT BY PUTTING THE DISHES ONE ABOVE THE OTHER UP TO 100 & THEN IT IS PRESSED WITH HEAVY WEIGHTS
7
IT IS PASSED THROUGH 3D CONVEYER FOIL TRANSFER MACHINE AT 140-160 DEG. C. WHICH HAS PROVISION FOR AIR COOLING
8
AFTER THE PIECE IS OUT FROM THE MACHINE, THE FOIL IS REMOVED AND THE FOIL IMAGE GETS TRANSFERRED ON THE DISH AND THE DISH GOES FOR FINAL POLISH

PROCESS FOR THE MANUFACTURE OF DECORATIVE STAINLESS STEEL ARTICLES

BACKGROUND OF THE INVENTION

1. Field of the Invention

The present invention relates to a novel process for the manufacture of decorative stainless steel articles. More particularly, the present invention relaters to a process for the manufacture of stainless steel articles having imprinted or laminated thereon colorful images and designs. Stainless steel articles of particular interest manufactured in accordance with the process of the present invention are table and kitchenware such as dishes, casseroles and utensils. The designs and images imprinted on the stainless steel articles by the process of the present invention are of permanent nature and resistant to erasure, fading or peeling under normal conditions.

2. Description of the Prior Art

Prior art discloses several processes for imprinting designs and images on materials other than stainless steel. Attempts to imprint permanent images and designs on smooth metallic surfaces such as stainless steel have always failed to meet with success. Apart from the fact that imprinting designs on stainless steel articles is highly expensive and therefore, not commercially viable, the designs imprinted tend to crack, peel and fade even under a normal careful usage.

It is therefore, an object of the present invention to provide a process for the manufacture of decorative stainless steel articles which is simple to carry out and is commercially and economically viable.

It is a further object of the present invention to provide a process for the manufacture of decorative stainless steel articles, which are highly aesthetic. It is a further object of the present invention to provide a process, which successfully imprints aesthetic designs and images on stainless steel articles with a uniform and smooth or matte finish.

It is yet another object of the present invention to provide permanent and aesthetic designs on stainless steel articles which are resistant to peeling, fading, discoloring and erasure under normal conditions of usage and wear and tear.

These and other objects of the present invention are achieved by the process of the present invention which is carried out under a combination of novel and carefully selected and controlled process parameters and conventional art of employing transfer foils to transfer images and designs to the articles.

SUMMARY OF THE INVENTION

The present invention provides a process for the manufacture of decorative stainless steel articles which comprises washing a stainless steel perform to a temperature in the region of from 120 to 140 degree C. to remove impurities therefrom, applying, if desired, a conventional base coat to said perform, affixing a transfer foil containing the design to be imprinted on to said base coated preform, removing any air bubbles present therein, and heating the preform to a temperature between 140 to 160 degree C., allowing the preform to cool and removing said transfer foil to obtain said decorative stainless steel articles having the desired design imprinted thereon.

The process of the present invention has several industrial applications. It can be applied to any stainless articles of industrial use where a permanent aesthetic appeal is an important factor. It can also be applied to various household and commercial items such as dishes, utensils, casseroles, wall ornaments, artificial jewelleries and the like. Compared to ceramic and porcelain, stainless steel per se has a very wide industrial application by virtue of it being unbreakable and rust proof. The process of beautifying it with permanent images and designs, which are extremely appealing to the naked eye further adds considerable value to the alloy the aesthetic of which hitherto was restricted to mirror finishes.

BRIEF DESCRIPTION OF THE DRAWINGS

FIG. 1 is a flowchart showing a process of the present invention.

DETAILED DESCRIPTION OF THE PREFERRED EMBODIMENT

The present invention provides a process for manufacturing decorative stainless steel articles. It utilizes a step of imprinting colorful designs, pictures, images and ornamentations on to stainless steel in a permanent fashion by a unique and novel step of transferring images from a transfer foil under carefully controlled heat treatment.

The invention will now be described in a greater detail with reference to a non-limitative preferred embodiment for manufacturing a decorative dish, which is for the purpose of illustration only. (see FIG. 1) It will be readily apparent to a person skilled in the art that various other embodiments of the process can be carried out for the manufacture of articles other than that described in the preferred embodiment without deviating from the spirit and scope of the invention. From a non magnetic stainless steel sheet, circles, hereinafter referred to as preforms, are cut. (see step 1 in FIG. 1) The size and gauge are not critical and are purely dictated by the size and thickness of the finished article required. The preforms are thereafter, pressed on conventional moulds and dies to obtain a dish. (see step 2 in FIG. 1) Preferably, double action presses are used. The dish is then thoroughly polished to make the surface smooth (see step 3 in FIG. 1), since a rough and uneven surface can adversely affect the application of the base coat print and can also leave undesirable gaps in the finish of the final product. The polished dish is then washed with a conventional cleaning agent, preferably, a conventional thinner and thereafter subjected to a heat treatment in a furnace. (see step 4 in FIG. 1) Most preferably, industrial thinner such as nitrocellulose is employed. Care is taken to ensure that the temperature of the furnace is maintained between 120 to 140 degree C. so that any impurity present on the surface of the dish is removed. The temperature itself is not critical but merely a matter of convenience to ensure that the possibility of any impurity present on the dish surface after the washing step is eliminated. Also, at this temperature, the surface of the dish gets deoxidized which improves the surface bonding between the paint and steel surface and also ensures better and durable printing.

After heat treatment, the surface of the dish is painted with a conventional industrial paint to form a base coat. Goods results are obtained by painting with a spray gun using a stoving paint, which is a mixture of pigment, and enamel oil. The base coated dish is baked at a conventional baking temperature, the actual temperature and the duration depending upon the industrial paint employed. Best results are obtained if the baking temperature is in the region of 160 to 180 degree C. for about 15 to 25 minutes, most preferably for about 25 minutes. (see step 5 in FIG. 1) Baking ensures that the paint remains permanent and does not peel off from the smooth metallic surface. Once the base coat is firmly baked on the dish, the dish is removed from the furnace and air cooled. To obtain an excellent smooth finish, the painted dish is sprayed with a special TSA lacquer and passed through a furnace at 160 to 180 degree C. for about 20 minutes and thereafter air cooled.

Transfer foil containing the desired images or designs is then affixed to the lacquered dish with a conventional glue, preferably, glue diluted with water. (see step 6 in FIG. 1) Transfer foil employed is preferably a very thin type of foil made of release paper on which oil-based inks are used. These inks have the property of leaving their impressions on select surfaces such as porcelain, china, plastic etc. However, for the first time, the applicants have been successful in transferring images on a stainless steel surface by employing carefully selected temperature range, washing steps and diluted glues. Optimum results are obtained if the glue:water ratio is maintained at 1:20. Once the transfer foil is affixed to the dish, air is vacuumed out to eliminate all air bubbles. Thereafter the dish is subjected to a temperature of 140 to 160 degree C. and air cooled. Using a 3D Converter foil transfer machine with a conveyor belt ensures uniform heating of the machine from all directions. (see step 7 in FIG. 1) Ideally, the dish is heated for about 15 to 45 minutes, preferably for about 20 minutes. The temperature and duration ensure complete and uniform transfer of images on the dish surface. Thereafter, the dish is removed from the machine followed by the removal of the foil from the dish. (see step 8 in FIG. 1) The dish has the desired image or design transferred thereon. The dish is finally polished to give a shine and smooth finish.

We claim:

1. A process for making a decorative steel article, said method consisting essentially of the steps of:

(a) providing a stainless steel preform and shaping the preform to form a three-dimensional article;

(b) washing the preform;

(c) manually applying a coating on a surface of the preform;

(d) manually transferring a decorative pattern on the coated surface.

2. The process of claim 1, further comprising the step of heating the preform to a deoxidizing temperature after washing it.

3. The process of claim 1, wherein the coating step includes applying a base coat to a surface of the preform and applying lacquer on the base coat.

4. The process of claim 1, wherein the transferring step includes manually securing a transfer foil that includes the decorative pattern to the coated surface, heating the transfer foil and preform, and manually removing the transfer foil while leaving the decorative pattern on the coated surface.

5. A process for the manufacture of a decorative steel article consisting essentially of the steps of:

(a) washing stainless steel preform of desired size and shape with a washing agent, (b) subjecting the washed preform to a deoxidizing temperature to remove impurities therefrom, (c) applying a base coat to said preform, (d) applying lacquer on said base coat to impart thereto a smooth finish, (e) manually applying on said coated preform a transfer foil containing a desired design or image to be imprinted on said preform, (f) manually removing any air bubbles present therein, (g) heating the transfer foil pasted preform to a temperature between 140 to 160 degree C, (h) allowing the preform to cool, and (i) manually removing the transfer foil to obtain said finished decorative stainless steel articles having printed thereon the desired design or image.

6. A process as claimed in claim 5, wherein said preform is a shaped article.

7. A process as claimed in claim 6, wherein said shaped article is a dish.

8. A process as claimed in claim 5, wherein said deoxidizing temperature is preferably between 120 to 140 degree C.

9. A process as claimed in claim 5, wherein said preform is polished prior to washing it.

10. A process as claimed in claim 5, wherein said washing agent is a conventional thinner.

11. A process as claimed in claim 10, wherein said conventional thinner is nitrocellulose.

12. A process as claimed in claim 5, wherein said base coat is an industrial paint.

13. A process as claimed in claim 12, wherein said industrial paint is a stovig paint comprising pigment and enamel oil.

14. A process as claimed in claim 5, wherein the coated preform is subjected to baking.

15. A process as claimed in claim 14, wherein the baking temperature is between 160 to 180 degree C.

16. A process as claimed in claim 14, wherein the baking is carried out for a period of 15 to 45 minutes.

17. A process as claimed in claim 16, wherein said baked preform is coated with a TSA lacquer.

18. A process as claimed in claim 16, wherein said coated preform is heated at a temperature between 160–180 degree centigrades for about 20 minutes and thereafter cooled.

19. A process as claimed in claim 5, wherein said transfer foil comprises a very thin foil of release paper with oil based ink.

20. A process as claimed in claim 5, wherein said transfer foil is affixed on said preform with a diluted colorless glue.

21. A process as claimed in claim 20, wherein said colorless glue has a glue:water ratio of about 1:20.

* * * * *